March 8, 1938.    H. F. DOTY    2,110,291
BRAKE
Filed Feb. 17, 1936
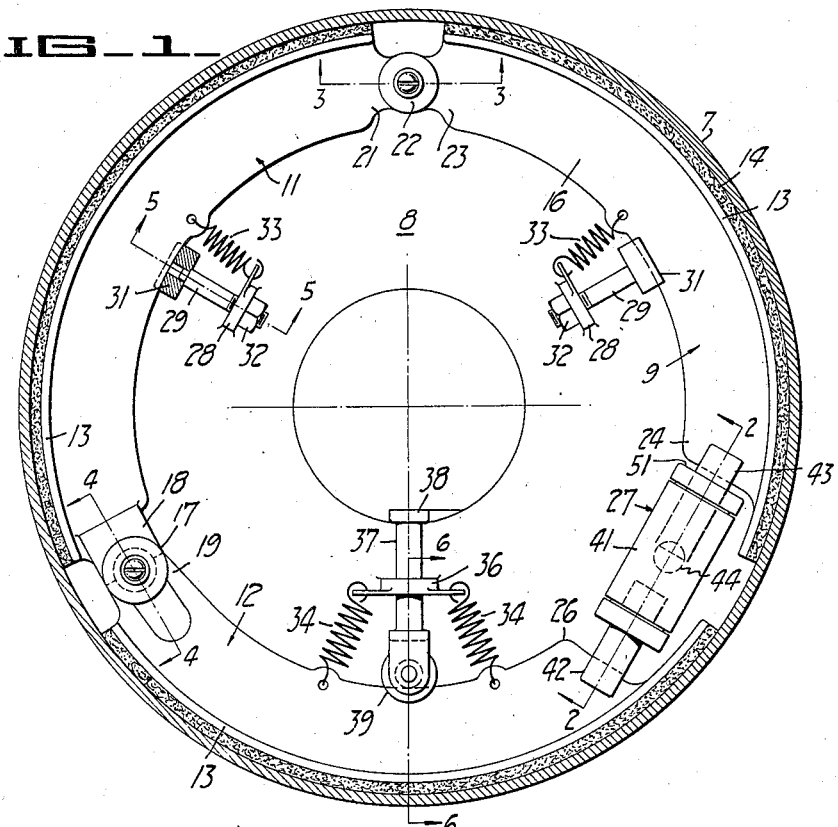
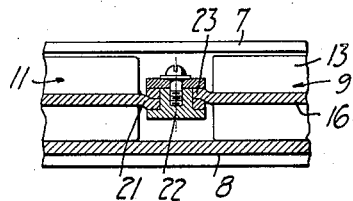
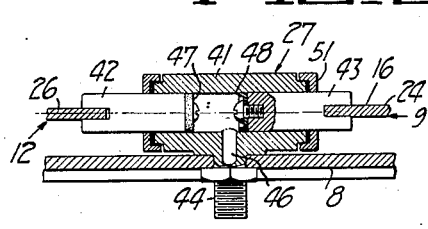
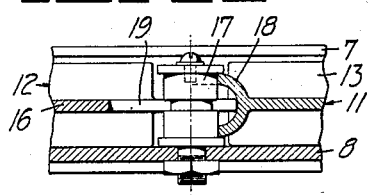
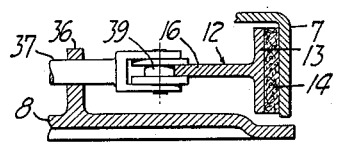
INVENTOR.
Harold F. Doty
BY
Joseph B. Gardner
ATTORNEY.

Patented Mar. 8, 1938

2,110,291

UNITED STATES PATENT OFFICE 2,110,291

BRAKE

Harold F. Doty, Oakland, Calif.

Application February 17, 1936, Serial No. 64,364

2 Claims. (Cl. 188—152)

The invention relates to brakes such as used in connection with automobiles and more particularly to the construction of such brakes, as are classed generally as mechanically or hydraulically operated.

An object of the invention is to provide a brake of the character described which will embody both a direct mechanical and a hydraulic operation, the former for insuring a degree of positiveness in the operation of the brake, and the latter for providing an equal application of braking force to each of the wheels of the vehicle.

Another object of the invention is to provide a brake of the character described in which the mechanical or hydraulic actuating means will be so arranged as to augment the operation of the other and provide for positive actuating of the brake in the event of the failure of either of these mechanisms to operate.

A further object of the invention is to provide a brake of the above described character, which will be self energized to the extent of transferring a part of the kinetic energy of the moving vehicle into braking energy and thereby greatly increasing the available braking power with a minimum expenditure of energy by the operator of the vehicle.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a vertical sectional view of a brake constructed in accordance with the present invention in partially applied position.

Figure 2 is a transverse sectional view of a fluid expansion chamber connecting certain shoes of the brake apparatus and is taken substantially on the plane of line 2—2 of Figure 1.

Figure 3 is a transverse sectional view of a pivotal connection between the ends of certain of said brake shoes and is taken substantially on the plane of line 3—3 of Figure 1.

Figure 4 is a transverse sectional view of one of the supporting means for the several brake shoes and is taken substantially on the plane of line 4—4 of Figure 1.

Figure 5 is a transverse sectional view of another brake shoe supporting means and is taken substantially on the plane of line 5—5 of Figure 1.

Figure 6 is a transverse sectional view of the mechanical actuating means for the brake and is taken substantially on the plane of line 6—6 of Figure 1.

The brake, as illustrated in the accompanying drawing is in part of more or less standard construction including a rotary brake drum 7, a stationary brake plate 8 mounted opposite thereto and a plurality of brake shoes 9, 11 and 12, which are supported on plate 8 in circumferential relation to the drum and are arranged for movement against the drum 7 for checking its movement. The shoes are formed with an outer cylindrical portion 13 which is backed by a radially extending rib 16 and carries a brake lining 14. Means for supporting the shoes on the plate 8 consist of an anchoring stud 17 which supports the adjacent ends 18 and 19 of the shoes 11 and 12, while the other end 21 of shoe 11 is pivotally connected by means of a pin 22 with the adjacent end 23 of the shoe 9 and the opposite ends 24 and 26 of the shoes 9 and 12 are interconnected by a hydraulic means 27. The shoes 9 and 11 are further supported and held in proper position by means of mounting devices each consisting of a projection 28 on the backing plate 8 and which threadably carries a stud 29 engaging at its outer end in a member 31 carried on the rib 16 of the shoes for adjusting the radial position of the shoes. A nut lock 32 may be carried on the inner end of the studs. As will be clear from Figures 1 and 5 the members 31 are preferably slotted to straddle the rib 16 and afford a pivotal movement therebetween in the plane of the rib while the outer end of the stud is slidably carried in the member 31 thus permitting both a radial and a circumferential movement of the shoes. The shoes are normally held in retracted position and spaced from the drum by means of springs 33 secured to the projection 28 and the rib 16 of the shoes. A similar retraction of the shoe 12 is effected by means of a pair of springs 34, which are connected between the rib of the shoe and a projection 36 on the brake plate.

As will be clear from Figure 4, the end 18 of the shoe 11 is bifurcated and slotted so as to surround and abut the stud 17 and any circumferential force on the shoe 16 through the pivotal connection 22 to the shoe 11 will be checked by the stud and such force thereby translated into an outward movement of the shoes 9 and 11 against the inner circumference of the brake drum. In accordance with the present invention this circumferential force is arranged to be set up and the brake thereby applied by the use of the shoe 12 and a manually operated means for pressing the shoe against the inner side of the rotating drum. As here shown, this means consists of a shaft 37 which is slidably carried by the projection 36 and which extends therethrough and is connected at its outer end to a roller 39 engaging the inner edge of the rib 16 of the shoe 12. Actuation of the shaft 37 is effected through means of a lever 38 which, may in turn, be connected to the foot pedal or the like (not shown) of the vehicle. It will thus be clear that with drum rotating in a counter-clockwise direction, with reference to Figure 1, the pressing of the shoe 12 against the drum will set up a circumferential force which is transmitted through the hydraulic means 27 and expands the brake shoes 9 and 11 against the inner circumference of the drum. The hydraulic means 27, as shown in Figure 2, comprises a cylinder 41 in which are reciprocately carried a pair of pistons 42 and 43, which slidably carry, in slots at their outer ends, the ends 26 and 24 respectively, of the brake shoes 9 and 12. The cylinder 41 is fixed to the stationary plate 8 by means of a fluid fitting 44 which is formed integrally with the body of the cylinder and is provided with a fluid passage 46, which connects with the cylinder at an intermediate point of its length and between the opposite heads 47 and 48 of the pistons 42 and 43. The fitting 44 is connected by means of suitable conduits (not shown) with the hydraulic cylinders of the brake units on the other vehicle wheels, whereby the braking force transmitted through each hydraulic means of the several brake units will be equalized. The hydraulic brake system above described is connected to be actuated by the brake pedal which operates lever 38.

As an important safety feature of the present invention, should one of the fluid lines of the brake system sever and the fluid escape, the piston head 47 will move directly against the head 48 and provide a direct physical connection between the shoes 12 and 9 and thus cause the brake to operate notwithstanding the loss of fluid. On the other hand, should one of the manual connections operating the levers 38, break, the operation of the other brake units will establish a fluid pressure in the hydraulic cylinder of the defective brake and thereby transmit to this brake a braking force equal to that applied to the other brakes.

Operation of the brake during the reverse movement of the vehicle is afforded by a somewhat reversed movement of the several parts. As will be clear from Figure 4, the end 19 of the shoe 12 is slotted to surround the stud 17 and engage in the socket provided by the bifurcated end 18 of the shoe 11. On the other hand, the end 24 of the shoe 9 is mounted in proximity to the end 51 of the hydraulic cylinder and is arranged to move thereagainst upon a clockwise circumferential displacement of the shoes. Thus, with the vehicle in reverse, and the shoe 12 pressed against the brake drum, the circumferential force of the brake shoe 12 will be transmitted through the engaged ends 19 and 18 of the brake shoes 12 and 11 to first move the end 24 of shoe 9 against the end of the cylinder and then cause a radial expansion of the shoes 9 and 11 against the inner circumference of the drum.

It will now be clear that by reason of the manually operated brake shoe 12 and the connection afforded between this shoe and the other shoes regardless of whether the hydraulic means is in operation, an extremely positive and reliable brake is provided. Also in combination with this positiveness and safeness in operation, the innerpositioning of the hydraulic means insures the application of an equal braking pressure to each of the brake units. Furthermore, and as an important feature of the present invention the actual operating force is, for the most part, taken from the rotating brake drum itself by the frictional drag of the drum against the shoe 12 and in this manner the kinetic energy of the moving vehicle is employed to cause a braking of the vehicle's movement. This self energizing feature of the brake, as will be understood, provides a powerful braking action while reducing the manual force required of the operation to a minimum.

When the cylinder is filled with fluid and the shoe 12 is mechanically brought into contact with the rotating drum, the piston 42 is moved to the right, as viewed in Figure 2, and such movement forces the fluid in the cylinder to the right thus increasing the pressure against the piston 43, and thereby increasing the pressure exerted on shoe 9.

I claim:

1. A brake mechanism for a brake drum or the like comprising, a brake shoe, mechanically operated means for moving said shoe against said drum, a second brake shoe, hydraulic means comprising a cylinder and piston connected between said shoes and containing fluid in said cylinder for moving said second shoe against said drum on movement of said first shoe by said mechanically operated means, said hydraulic means being provided with opposed portions engageable for directly transmitting movement from said first to second named shoe in the absence of said fluid.

2. A brake mechanism for each of a plurality of brake drums comprising, a plurality of brake shoes movable against said drum, one of said shoes being circumferentially displaceable relative to said drum, mechanically operated means for moving said last named shoe against said drum, and hydraulic means for transmitting the circumferential force on said last named shoe on engagement thereof with said drum to said other shoe, and being adapted for connection to the similar hydraulic means of the other brake mechanisms to equalize the force transmitted from each of the circumferentially displaceable shoes to the other shoe, said hydraulic means comprising a cylinder, a pair of opposed pistons in said cylinder connected to said circumferentially displaceable shoe and said other shoe and operative on fluid therebetween to transmit force between said shoes and being adapted to abut in the absence of said fluid to transmit said force by direct contact with each other.

HAROLD F. DOTY.